US012779804B2

(12) United States Patent
Malval et al.

(10) Patent No.: US 12,779,804 B2
(45) Date of Patent: Nov. 3, 2026

(54) TIRE-PRODUCING FACILITY PROVIDED WITH TOOL-FOLLOWING LINKAGES

(71) Applicant: Compagnie Generale Des Etablissements Michelin, Clermont-Ferrand (FR)

(72) Inventors: Guilhaume Malval, Clermont-Ferrand (FR); Denis Meloux, Clermont-Ferrand (FR); Clement Meallier, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 159 days.

(21) Appl. No.: 18/705,713

(22) PCT Filed: Oct. 25, 2022

(86) PCT No.: PCT/FR2022/052017
§ 371 (c)(1),
(2) Date: Apr. 29, 2024

(87) PCT Pub. No.: WO2023/084171
PCT Pub. Date: May 19, 2023

(65) Prior Publication Data

US 2024/0424755 A1 Dec. 26, 2024

(30) Foreign Application Priority Data

Nov. 9, 2021 (FR) ........................................ 2111844

(51) Int. Cl.
*B29D 30/30* (2006.01)

(52) U.S. Cl.
CPC .. *B29D 30/3021* (2013.01); *B29D 2030/3078* (2013.01)

(58) Field of Classification Search
CPC .. B29D 30/0016; B29D 30/005; B29D 30/08; B29D 30/16; B29D 30/1621; B29D 30/1628; B29D 30/18; B29D 30/244; B29D 30/30; B29D 30/3021; B29D 30/3028; B29D 2030/0022; B29D 2030/0038;
(Continued)

(56) References Cited

U.S. PATENT DOCUMENTS 6,355,126 B1 * 3/2002 Ogawa ............... B29D 30/1657 156/123
2006/0108051 A1 5/2006 Lacagnina
(Continued)

*Primary Examiner* — Sedef E Paquette
(74) *Attorney, Agent, or Firm* — Dickinson Wright PLLC

(57) ABSTRACT

The installation is intended for the manufacture of tires, and includes a work area with a drum, a magazine provided with a support carrying a plurality of laying tools, and a manipulator robot. The manipulator robot is arranged to selectively grasp a laying tool waiting in the magazine and bring the laying tool to the drum and then return the laying tool to the magazine and detach itself from the laying tool. Several of the laying tools are each carried by an articulated compass. The compass includes a barrel that is attached to the support and orientable in yaw, a first arm which is attached to the barrel by a first pivot connection of horizontal axis, and a second arm. The second arm is articulated on the first arm by a second pivot connection of horizontal axis and whose free end is attached to the laying tool.

14 Claims, 2 Drawing Sheets

(58) Field of Classification Search
CPC ...... B29D 2030/1678; B29D 2030/203; B29D 2030/205; B29D 2030/3064; B29D 2030/3078; B29D 2030/3221; B29D 2030/3278
USPC ............................................... 156/110.1, 117
See application file for complete search history.

(56) References Cited

U.S. PATENT DOCUMENTS

| | | | | |
|---|---|---|---|---|
| 2013/0078058 | A1* | 3/2013 | Marchini | B29D 30/0016<br>414/222.01 |
| 2021/0023804 | A1* | 1/2021 | Sangiovanni | B29D 30/60 |
| 2022/0001635 | A1 | 1/2022 | Pialot et al. | |
| 2022/0371296 | A1 | 11/2022 | Dubois et al. | |

* cited by examiner

TIRE-PRODUCING FACILITY PROVIDED WITH TOOL-FOLLOWING LINKAGES

CROSS-REFERENCE TO RELATED APPLICATION

The subject application claims priority to PCT Application No. PCT/FR2022/052017, filed 25 Oct. 2022, and entitled "TIRE-PRODUCING FACILITY PROVIDED WITH TOOL-FOLLOWING LINKAGES," and to French Patent Application No. FR2111844, filed 9 Nov. 2021, and entitled "TIRE-PRODUCTION FACILITY PROVIDED WITH TOOL-FOLLOWING LINKAGES," the entire contents of which are both herein incorporated by reference.

BACKGROUND

1. Field

The present disclosure relates to the field of manufacturing tires for vehicle wheels, and more particularly the manufacture of pneumatic tires.

2. Related Art

In order to carry out this type of manufacture, it is known to use automated installations which make it possible to lay successively on a support, such as a drum, the various constituent components of the tire.

To install these various components, it is generally necessary to have several laying tools, distributed over several stations, and to move the drum successively from one station to another.

However, such installations are particularly bulky and expensive. They are all the more bulky the greater the variety of tires to be produced, and therefore the greater the number of tire components to be provided and, where appropriate, the greater the number of drums of different dimensions to be provided.

SUMMARY

The objects assigned to the subject disclosure are consequently aimed at overcoming the abovementioned drawbacks and proposing a novel installation for the manufacture of tires which is particularly compact and efficient, while being very versatile so as to be able to produce a wide variety of tires.

The objects assigned to the subject disclosure are achieved by means of an installation intended for the manufacture of tires for vehicle wheels, the installation being characterized in that it comprises:

a work area comprising a drum which is rotatably mounted about its central axis and which is intended to receive a plurality of components that are constituents of a tire, preferably rubber-based components, a magazine, which is placed at the periphery of the work area and has a support carrying a plurality of separate laying tools, each intended for laying a different component, a manipulator robot which is arranged to firstly selectively grasp a laying tool waiting in the magazine and bring the laying tool to the drum in order to use the laying tool to lay the corresponding component on the drum, then return the laying tool to the magazine and detach itself from the laying tool in order to exchange it for another laying tool present in the magazine, and in that several of the laying tools are each connected to the support of the magazine by an articulated follower member, called a "compass", which is specific to the laying tool in question and which is arranged to accompany the laying tool when the laying tool is moved by the manipulator robot, each compass comprising for this purpose:

a barrel, by means of which the compass is attached to the support of the magazine and which allows the compass to be oriented in yaw by carrying out, with respect to the support of the magazine, a rotation about a vertical axis, a first arm which is attached to the barrel by a first pivot connection of horizontal axis which allows the first arm to tilt in pitch with respect to the barrel, a second arm which is articulated on the first arm by a second pivot connection of horizontal axis, distant from the first pivot connection, which allows the second arm to tilt in pitch with respect to the first arm, the second arm having, at a distance from the second pivot connection, a free end to which the laying tool in question is attached.

Advantageously, the installation according to the subject disclosure makes it possible for a manipulator robot, here a single robot, to be shared by several laying tools each dedicated to a given component. This makes it possible to significantly reduce the floor space of the installation, while having the possibility of laying a wide variety of different components, with as many separate laying tools, which will be grasped, activated and manipulated one after the other by the same manipulator robot, according to requirements.

Advantageously, the compasses make it possible to accompany the laying tools in the movements imposed on them by the manipulator robot, and facilitate the compact storage of the laying tools in the magazine as well as the placing of the laying tools at the disposal of the manipulator robot. Specifically, the arms of each compass are advantageously folded one against the other when the laying tool is parked waiting in the magazine, away from the drum, and can advantageously be unfolded, opening to move away from each other, when the manipulator robot grasps the laying tool and moves it away from the waiting location that the laying tool occupied in the magazine, to reach the drum.

Advantageously, the pivot connections of the arms of the compass enable the compass to cover any useful variation in distance, as well as any possible useful variation in height, of the laying tool with respect to its parking location in the magazine, and therefore also with respect to the drum, to allow the laying tool to carry out, in the vicinity of the drum, the movements necessary to lay the corresponding component on the drum. In addition, the barrel allows the overall orientation of the compass in yaw to be changed, so that, in combination with the adjustment of the distance of the laying tool with respect to the barrel, the compass leaves the laying tool free to access any point of the work area as desired by the manipulator robot, and to follow any trajectory imposed by the manipulator robot.

BRIEF DESCRIPTION OF THE DRAWINGS

Other objects, features and advantages of the subject disclosure will become apparent in greater detail on reading the following description, as well as with the aid of the appended drawings, provided purely by way of illustration and without limitation, in which.

DETAILED DESCRIPTION OF THE ENABLING EMBODIMENT

The present disclosure relates to an installation 1 intended for the manufacture of tires for vehicle wheels, preferably pneumatic tires.

Figure 1:
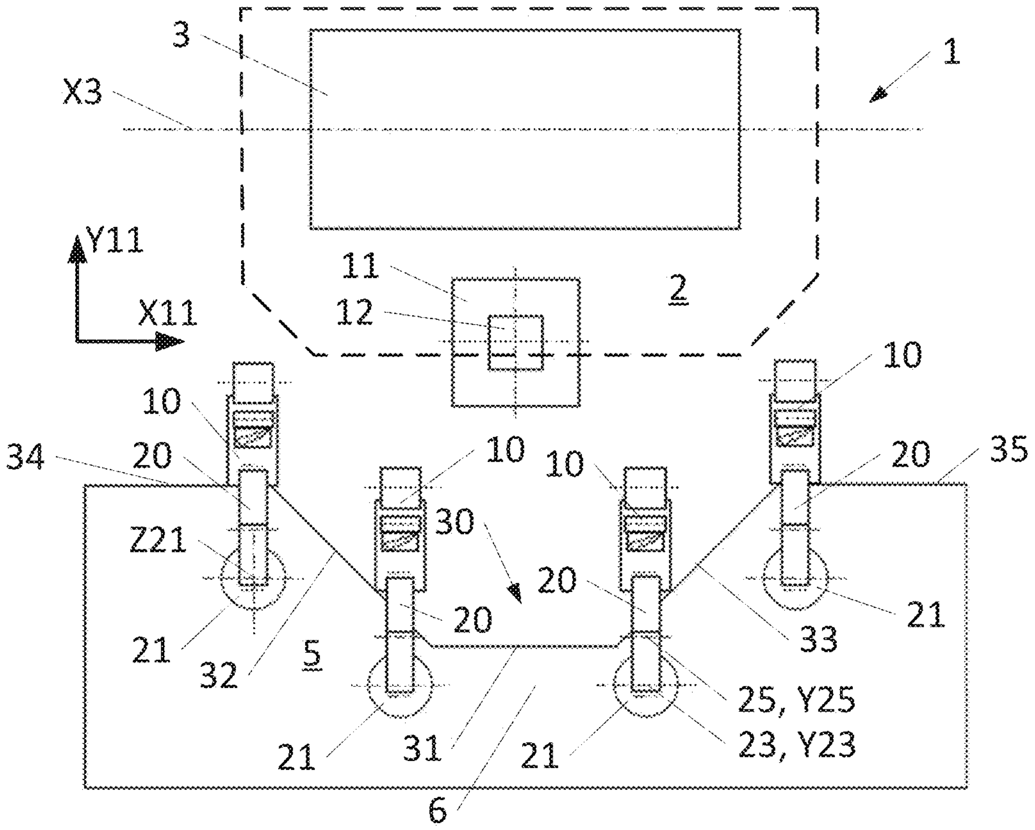
FIG. 1 illustrates, in a schematic top view, an installation according to the subject disclosure which comprises several compasses, all of which are here in a folded configuration which the compasses adopt when their respective laying tools are each located at their parking location, waiting in the magazine.
Figure 2:
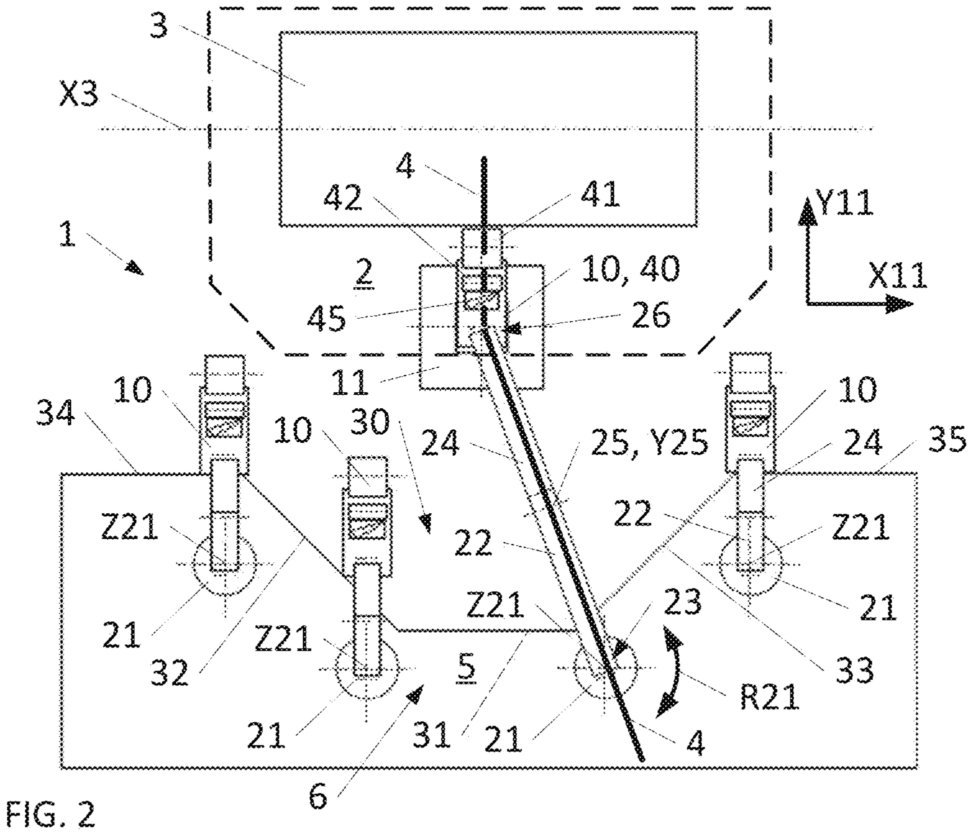
FIG. 2 illustrates, in the same schematic top view as FIG. 1, the installation within which the manipulator has grasped one of the laying tools to bring it to the drum, and the corresponding compass has been deployed and oriented in such a way as to accompany the movement of the laying tool, to follow the trajectory imposed on the laying tool by the manipulator robot.

The installation 1 comprises a work area 2, illustrated in dashed lines in FIGS. 1 and 2.

This work area 2 comprises a drum 3 which is mounted to rotate about its central axis X3 and which is intended to receive a plurality of components 4 that are constituents of a tire.

Preferably, the central axis X3 of the drum 3 is horizontal.

Preferably, the components 4 that are constituents of the tire will be rubber-based components.

These components 4 may in particular include extruded bands formed as a single piece of a rubber-based material, or rubber strips, or else reinforcing strips, such as, for example, strips comprising a rubber matrix in which reinforcing threads, preferably metallic threads, are embedded, which can be arranged parallel to one another and parallel to the longitudinal direction of the strip, or else composite strips comprising a resin matrix in which glass or polyamide reinforcing fibres are embedded.

The installation 1 also comprises a magazine 5, which is placed at the periphery of the work area 2, and which has a support 6 carrying a plurality of separate laying tools 10, each intended to lay a different component 4.

It will thus be possible to have available a wide variety of components 4, and suitable laying tools 10, to produce different models of tires.

As long as it is not used to lay a component 4 on the drum 3, each laying tool 10 is stored in standby in the magazine 5 at a predetermined parking location on the support 6, which parking location is specific to the laying tool 10.

Figure 3:
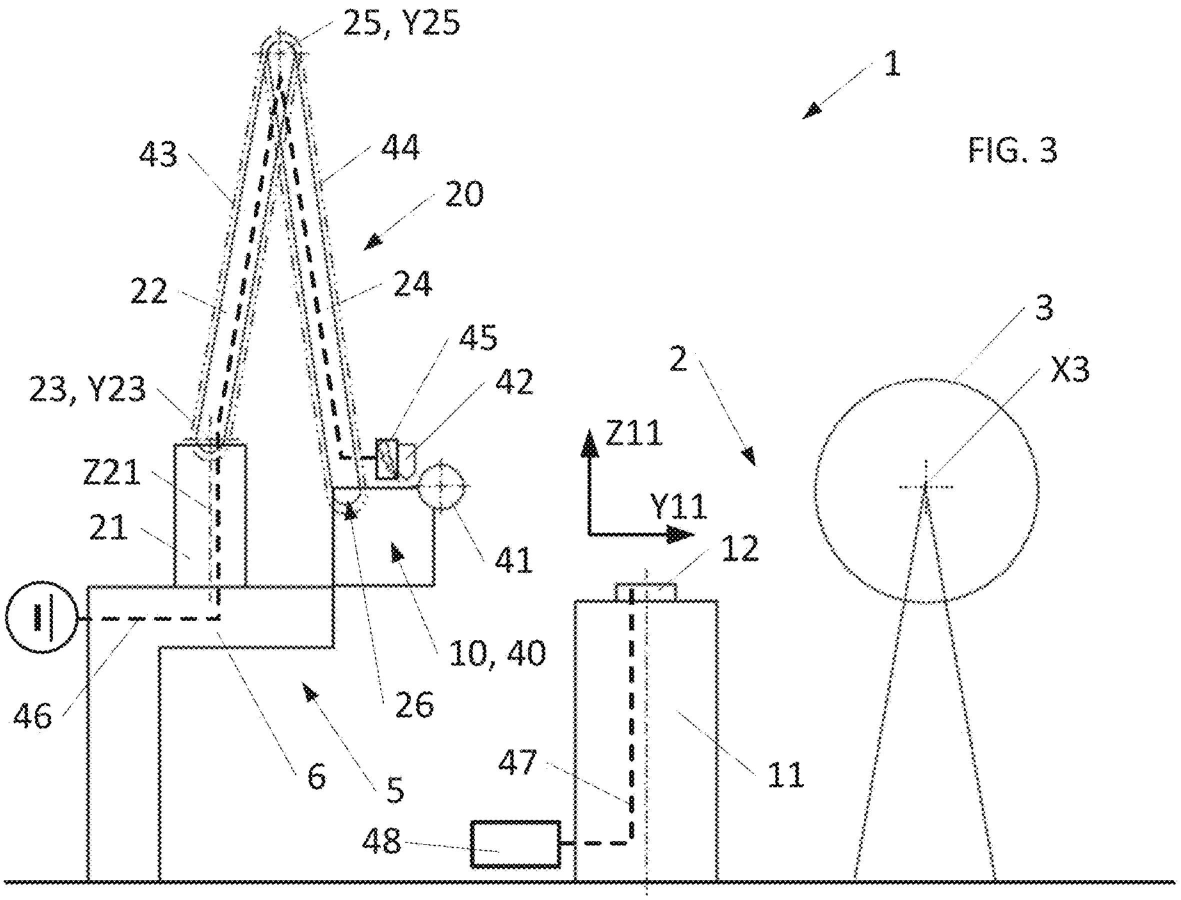
FIG. 3 illustrates, in a schematic side view, a compass used by the installation of FIG. 1, in the folded configuration adopted when the laying tool is in its parking location, waiting in the magazine.
Figure 4:
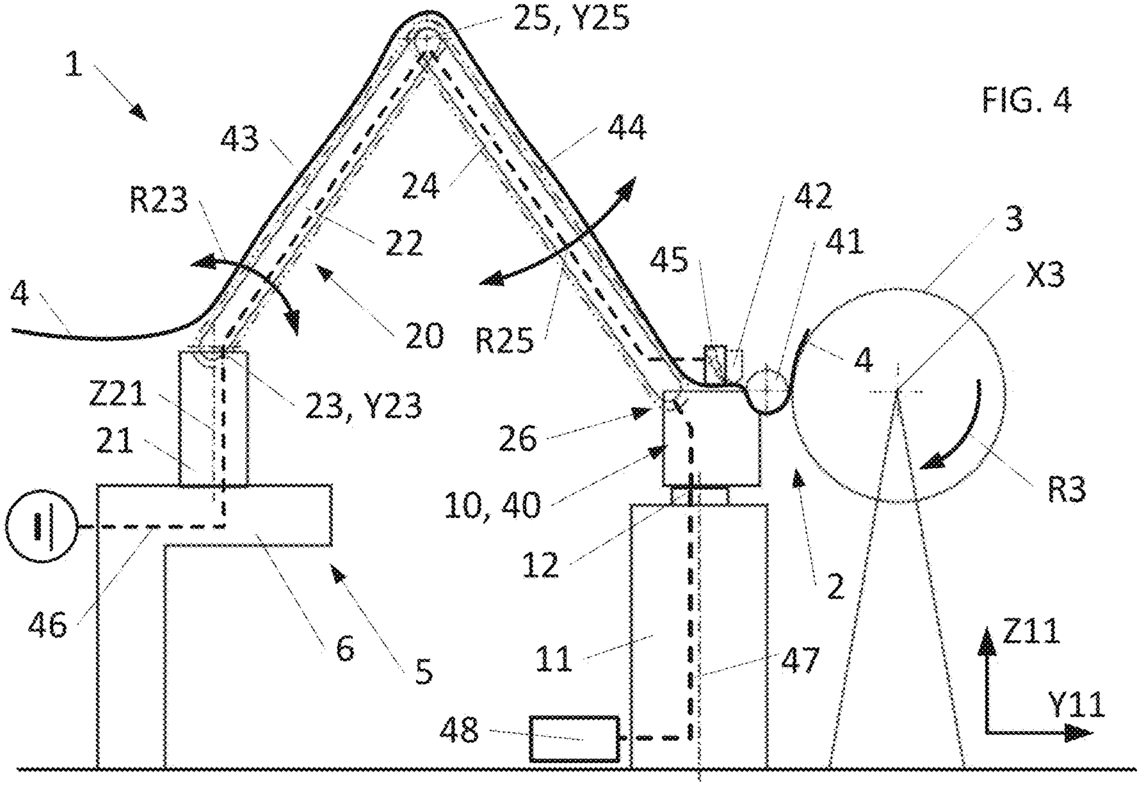
FIG. 4 illustrates, in the same schematic side view, the compass of FIG. 2 in an extended configuration, when the compass accompanies the movement of the laying tool grasped and driven by the manipulator robot.

The installation 1 also comprises a manipulator robot 11 which is arranged to firstly selectively grasp a laying tool 10 waiting in the magazine 5 and bring the laying tool 10 to the drum 3 in order to use the laying tool 10 to lay the corresponding component 4 on the drum 3, as can be seen in FIGS. 2 and 4, then return the laying tool 10 to the magazine 5 and detach itself from the laying tool 10, as illustrated in FIGS. 1 and 3, in order to be able to exchange the laying tool 10 for another laying tool 10 present in the magazine 5.

Advantageously, the manipulator robot 11 will thus be shared between the various laying tools 10 stored in the magazine 5 and will have a common docking interface 12 adapted to all of the laying tools 10, so that the manipulator robot 11 will be able, for each laying operation, to select the suitable laying tool 10 delivering the required component, access the location of the laying tool 10 in the magazine 5 and couple to the laying tool 10 by means of the docking interface 12 in order to load and transport the laying tool 10 from the magazine 5 to the drum 3, use the laying tool 10 to lay the desired component 4 on the drum 3, typically by winding or spooling the component 4 on the drum 3 while the drum 3 is driven with a rotational movement R3 about its central axis X3, then, finally, return the laying tool 10 to the magazine 5 and uncouple from the laying tool 10, thus releasing the latter into the magazine 5, in a predetermined waiting position, and thus freeing the docking interface 12 for another laying tool 10.

The use of several interchangeable laying tools 10 and of a common manipulator robot 11 will advantageously make it possible to minimize the floor space requirement of the installation 1 while allowing a wide variety of laying operations within the same relatively small work area 2.

The manipulator robot 11 will preferably be designed to move the laying tool 10 in a horizontal plane, in a first horizontal direction X11 and a second horizontal direction Y11 which are perpendicular to each other. According to a possible variant embodiment, the manipulator robot 11 may also move the laying tool 10 in height in a third vertical direction Z11. More generally, the manipulator robot 11 may be arranged to perform any movement useful for laying the components 4.

According to the subject disclosure, several of the laying tools 10, and where appropriate all of the laying tools 10, are each connected to the support 6 of the magazine 5 by an articulated follower member 20, called a “compass” 20, which is specific to the laying tool 10 in question and which is arranged to accompany the laying tool 10 when the laying tool 10 is moved by the manipulator robot 11, each compass 20 comprising for this purpose:

- a barrel 21, by means of which the compass 20 is attached to the support 6 of the magazine 5 and which allows the compass 20 to be oriented in yaw by carrying out, with respect to the support 6 of the magazine 5, a rotation R21 about a vertical axis Z21; the barrel 21 thus advantageously provides a permanent but orientable anchoring of the compass 20 on the support 6,
- a first arm 22 which is attached to the barrel by a first pivot connection 23 of horizontal axis Y23 which allows the first arm 22 to tilt in pitch R23 with respect to the barrel 21,
- a second arm 24 which is articulated on the first arm 22 by a second pivot connection 25 of horizontal axis Y25, distant from the first pivot connection 23, which allows the second arm 24 to tilt in pitch R25 with respect to the first arm 22, the second arm 24 having, at a distance from the second pivot connection 25, a free end 26 to which the laying tool 10 in question is attached.

Each compass 20, separate from the manipulator robot 11, advantageously ensures the accompaniment of the laying tool 10 when the laying tool 10 is unhooked and extracted from the support 6 by the manipulator robot 11, then driven in movement into the work area 2 by the manipulator robot 11. Specifically, thanks to the degrees of freedom in yaw and pitch granted by the compass 20, the free end 26 of the compass 20, which is connected to the laying tool 10, can advantageously move with respect to the support 6 and access any desired position in the work area 2, and thus follow the laying tool 10 whatever the trajectory and the position imposed on the laying tool 10 by the manipulator robot 11.

Advantageously, whatever the position and trajectory of the laying tool 10, the compass 20 advantageously guarantees that the laying tool 10 is permanently supplied with the desired component 4. Specifically, the compass 20 makes it possible to transport and guide the component 4 to the laying tool 10, or a raw material allowing the laying tool 10 to produce the component 4, the component or raw material coming from a supply area which is situated outside the work area 2. This supply area may correspond to an area of the installation, other than the work area 2, in which the component 4, or the raw material necessary for producing the component 4, is stored or produced.

The first arm 22 and the second arm 24 are preferably rectilinear. Each of the arms 22, 24 preferably has a rigid structure, preferably of fixed length.

The horizontal axes Y23 and Y25 of the first and second pivot connections 23, 25 are preferably parallel to each other.

According to a first preferential arrangement possibility, which can be seen in FIGS. 3 and 4, the first arm 22 forms an ascending arm such that the second pivot connection 25 is situated at an altitude strictly greater than the altitude of the first pivot connection 23 which connects the first arm 22 to the barrel 21.

According to this first preferential arrangement possibility, the second arm 24 will then preferably form a descending arm such that its free end 26, and consequently the laying tool 10, is at an altitude strictly lower than that of the second pivot connection 25 which connects the second arm 24 to the first arm 22. The compass 20 will then have, seen in a vertical plane parallel to the arms 22, 24, an "A" arrangement.

According to a second preferential arrangement possibility, not shown, the first arm 22 will this time be a descending arm, and the second arm 24 an ascending arm, such that the compass will this time have a "V" arrangement.

Overall, and whatever the arrangement, as an A or V, considered, the compass 20 therefore preferably has a triangular structure, a first vertex of which is formed by the first pivot connection 23, a second vertex of which, which is higher in the A-shaped arrangement and lower in the V-shaped arrangement, is formed by the second pivot connection 25, and the third vertex of which is formed by the free end 26 carrying the laying tool 10. The base of this triangular structure, that is to say the distance separating the free end 26 from the first pivot connection 23 attached to the barrel 21 and therefore to the support 6 of the magazine 5, can advantageously be adjusted by causing the arms 22, 24 to tilt in pitch R23, R25, in order to increase the angle formed by the arms 22, 24 to unfold the arms 22, 24 and thus increase the distance, or, on the contrary, to reduce the angle to fold the arms 22, 24 in order to shorten the distance.

Preferably, when the compass 20 is in the folded configuration, the laying tool 10 being in standby in the magazine 5, then the ascending arm, whether one considers the A-shaped arrangement or the V-shaped arrangement, here for example the first arm 22 in FIGS. 3 and 4, is substantially vertical, that is to say that the ascending arm, here the first arm 22, then extends in a longitudinal direction which forms with the vertical axis Z21 an angle of less than 20 degrees, less than 10 degrees, or even a zero angle.

The rotation in yaw R21 of the barrel 21 also allows the compass 20, in projection in a horizontal plane, to be aligned in azimuth with the direction which is imposed, on the one hand, by the fixed point defined, with respect to the support 6, by the yaw axis Z21, and, on the other hand, by the second, movable point corresponding to the free end 26 and to the laying tool 10.

Thus, the compass 20 can advantageously follow all the trajectories imposed on the laying tool 10 by the manipulator robot 11 within the work area 2, and during transfers between the work area 2 and the magazine 5, and vice versa.

It will be noted that, preferably, the compasses 20 are passive in that the first and second pitch pivot connections 23, 25 and also the yaw pivot connection of the barrel 21, and more generally all the articulations of the compass 20 in question, are free in order to be oriented spontaneously under the movement constraints that the manipulator robot 11 imposes on the laying tool 10. More particularly, the connections will therefore preferably be non-motorized. The structure of the compass 20 will thus be particularly light and will adapt flexibly and immediately to the constrained movements of the laying tool 10.

It will be noted that the installation 1 may also comprise tools not attached to compasses 20, such as, for example, thickness measuring tools using a feeler, which may be available on the support 6 and accessible to the manipulator robot 11 in the same way as the laying tools 10.

According to a preferred feature, the support 6 of the magazine 5 has, as can be seen clearly in FIGS. 1 and 2, a notched arrangement 30 forming a concave delimitation with respect to the work area 2.

Advantageously, such a notched arrangement 30 makes it possible to arrange a relatively large number of compasses 20 in relative proximity to the work area 2 and the drum 3, and to alternately manipulate the various laying tools 10, and therefore the various corresponding compasses 20, without risking collision or trajectory interference between the manipulated laying tool 10, and therefore its compass 20, on the one hand, and the other laying tools 10, and their respective compasses 20, which are waiting in the magazine 5, on the other hand.

Here again, the compactness of the installation 1 is favoured, as well as its efficiency, since the distances and the durations of the journeys necessary for the changes of laying tool 10 are particularly short.

Preferably, the support 6 of the magazine 5 defines, in projection in a horizontal plane, and as is clearly visible in FIG. 1, a U-shape which opens onto the work area 2, the U-shape comprises a bottom branch 31 and two lateral branches 32, 33.

According to a preferential arrangement possibility, which corresponds to the installation illustrated in FIGS. 1 and 2, the support 6 of the magazine defines, in projection in the abovementioned horizontal plane, a trapezoidal U-shape which opens onto the work area 2 via the large base of the trapezium.

Whatever the arrangement of the branches 31, 32, 33 of the U-shape, compasses 20 are then preferably installed on at least two of the branches 31, 32, 33, more preferably on each of these three branches 31, 32, 33.

Advantageously, the branches 31, 32, 33 of the U-shaped structure thus form edges, preferably horizontal edges, which surround the work area 2, and on which it is advantageously possible to distribute a plurality of compasses 20, and more particularly the barrels 21 of the compasses 20, in such a way that the compasses 20 can be oriented and deployed freely, each in turn, without being hindered by or colliding with the other compasses 20 at rest. The U-shaped arrangement thus makes it possible to multiply the compasses 20 and therefore the laying tools 10 and the components 4 available, in a restricted space, while maintaining the reliability and operational safety of the installation 1.

Of course, the support 6 of the magazine 5 may extend beyond the notched arrangement 30, and for example comprise horizontal extensions 34, 35 parallel to the central axis X3 of the drum 3. The installation 1 may then comprise other laying tools 10 and/or other compasses 20 installed on these extensions 34, 35.

Preferably, to facilitate the introduction and then the removal of the drum 3 and to allow an operator free access to the work area 2 and to the support 6 for maintenance operations, the compasses 20 will all be situated on the same side of an imaginary vertical plane containing the horizontal central axis Z3 of the drum 3, which central axis Z3 is here preferably parallel to the direction of the bottom branch 31 of the U-shaped structure.

Preferably, at least one laying tool 10 is formed by a strip laying head 40.

Such a strip is in the form of a continuous and flattened band, which is conveyed in a direction corresponding to its longitudinal direction, and which arrives already formed at the laying tool 10, ready to be laid as it is on the drum 3. The strip may be a simple rubber strip, without reinforcing threads, or else a reinforcing strip which comprises a matrix, preferably rubber-based, in which reinforcing threads, for example metal threads, are embedded. Preferably, these reinforcing threads are continuous and extend parallel to one another, for example parallel to the longitudinal direction of the strip.

The strip laying head 40 comprises, as can be seen in particular in FIGS. 2, 3 and 4, an applicator roller 41 which is arranged to press a strip against the drum 3, as is illustrated in FIG. 4, and also a cutting blade 42 to cut the strip to the desired length at the end of laying.

Advantageously, the compass 20 which is associated with the strip laying head 40 preferably comprises a conveyor 43, 44 which is arranged to convey the strip along the first and second arms 22, 24 of the compass 20, as far as the strip laying head 40.

Preferably, the compass 20 will comprise a first conveyor 43 and a second conveyor 44, associated respectively with the first arm 22 and with the second arm 24. The strip will thus be conveyed and guided precisely along the arms 22, 24, without risk in particular of falling or catching in a possible obstacle.

The conveyor or conveyors 43, 44 may be motorized.

Preferably, when the compass 20 comprises an ascending arm and a descending arm, regardless of the order of the arms, then the conveyor assigned to the ascending arm will preferably be motorized, while the conveyor associated with the descending arm will preferably be passive, that is to say non-motorized. Thus, with a simple structure and a lower energy consumption, an efficient and smooth transport of the strip to the strip laying head 40 will be obtained.

In the example illustrated in FIGS. 3 and 4, there will thus be more particularly a first ascending conveyor 43 which will be motorized, while the second descending conveyor 44 will be passive.

As a variant, the two conveyors 43, 44 could be passive.

The strip will preferably be driven in traction by its winding on the drum 3, at the level of the applicator roller 41, while the first conveyor 43, if it is motorized, will be slaved as a function of the motorized rotation R3 of the drum 3, in order to regulate the tension of the strip, avoiding the appearance of excessive tension in the strip, which could deform the strip and thus generate defects in the tire, or, on the contrary, the appearance of excessive slackening of the strip, which could cause loss of control of the trajectory of the strip.

The strip may advantageously come from a station of the installation situated outside the work area 2, for example from a storage station comprising a reserve of strip wound on a reel, or from a preparation station comprising a calendar which produces the strip on the fly, as needed.

The cutting blade 42 may be of any appropriate shape, for example a straight blade performing a cutting movement or else a helical blade carried by a cutting cylinder mounted in rotation about an axis transverse to the longitudinal direction of the strip.

Preferably, the strip laying head 40 comprises a heating element 45 for heating the cutting blade 42.

The heating element 45 may be, for example, an electrical heating resistor.

According to a preferred feature, the energy supply 46, preferably electrical energy supply, of the heating element 45 passes through the compass 20, so as not to be interrupted when the manipulator robot 11 puts the strip laying head 40 back in the magazine 5 and detaches itself from the strip laying head 40, whereas the drive energy supply 47, for example pneumatic or electrical energy supply, which is intended to actuate the cutting blade 42 to cut the strip, passes through the manipulator robot 11, here more particularly through the docking interface 12, so as to be connected to the strip laying head 40 when the manipulator robot 11 grasps the strip laying head 40, then disconnected from the strip laying head 40 when the manipulator robot 11 separates again from the strip laying head 40.

Advantageously, such an arrangement makes it possible to permanently supply the heating element 45, and therefore to permanently keep the cutting blade 42 hot, including when the strip laying head 40 is waiting in the magazine 5, with the blade being maintained at the desired operating temperature, which is higher than ambient temperature, so that no cycle time is wasted heating the cutting blade 42 when the strip laying head 40 needs to be used.

It will be noted that this feature could in particular be applied whatever the connecting means forming the follower member which ensures the permanent connection between the support 6 and the strip laying head 40, and in particular whether this connecting means is a compass 20 or a connecting means other than a compass, so that the energy supply 46 of the heating element 45 would pass through the connecting means, separate from the manipulator robot 11, in order that the energy supply 46 of the heating element 45 is not interrupted when the strip laying head 40 is disconnected from the manipulator robot 11 and remains waiting in the magazine 5; whereas, moreover, supplies of other energies, in particular the drive energy supply 47 for actuating the cutting blade 42 and/or the energy supply of sensors or the drive energy supply of motorized members belonging to the strip laying head 40 or even belonging to the connecting means, in particular belonging to the compass 20, would pass through the docking interface 12 of the manipulator robot 11, and would therefore be connected to the strip laying head 40, and therefore be available and active, only when the manipulator robot 11 is coupled to the strip laying head 40, then disconnected when the manipulator robot 11 separates from the strip laying head 40.

The energy supply 46 of the heating element 45 may be achieved by any appropriate circuit passing through the compass 20, coming from the support 6 of the magazine 5, without passing through the manipulator robot 11.

The drive energy supply 47, which is in fact temporary, may be achieved by any appropriate circuit comprising, for example, a set of mating connectors, one of which is mounted on the manipulator robot, at the docking interface 12, and the other mounted on the strip laying head 40, and which fit together when the manipulator robot 11 couples with the strip laying head 40, and which thus remain connected as long as the manipulator robot 11 remains coupled to the strip laying head 40.

The fact that the drive energy supply circuit 48 is not made to pass through the compass 20 advantageously makes it possible to simplify and lighten the structure of the compass 20 by exploiting a shared drive energy supply 47 centralized at the manipulator robot 11.

Preferably, at least one of the laying tools 10 is formed by a rubber pump which comprises an extruder which generates a band of rubber-based material to be laid on the drum.

Such a rubber pump has been described in particular in previous patent applications filed by the applicant, for example EP-0690229, and will therefore not be repeated in detail here.

Preferably, the energy supply of the extruder can then be provided by the manipulator robot 11, by means of a mechanical coupling, such as a dog, which engages the rubber pump when the manipulator robot 11 grasps the rubber pump.

Here again, this will make it possible to improve the compactness and lightness of the compasses 20 in question, by using one and the same mechanical energy source, available via the manipulator robot 11, to supply separately, one after the other, the various rubber pumps of the installation 1.

It will be noted that, in general, the docking interface 12 which allows the coupling of the robot 11 with the laying tool 10 may advantageously be multi-energy, that is to say capable of transmitting both mechanical energy (by solid transmission or by pneumatic or hydraulic system) and electrical energy and/or electrical signals (for sensors, for example).

The installation 1 may moreover comprise other stations, in particular storage or preparation stations which will make it possible to store or prepare components 4 which will then be conveyed to the compass 20 and to the laying tools 10.

Of course, the subject disclosure is in no way limited only to the exemplary embodiments described above, a person skilled in the art being in particular capable of isolating or freely combining one or another of the abovementioned features, or of substituting equivalents for them.

What is claimed is:

1. An installation intended for the manufacture of tires for vehicle wheels, said installation comprises:

a work area comprising a drum which is rotatably mounted about its central axis and which is intended to receive a plurality of components that are constituents of a tire;

a magazine, which is placed at a periphery of the work area and has a support carrying a plurality of separate laying tools, each intended for laying a different component; and a manipulator robot which is arranged to firstly selectively grasp a laying tool waiting in the magazine and bring said laying tool to the drum in order to use said laying tool to lay the corresponding component on the drum, then return said laying tool to the magazine and detach itself from said laying tool in order to exchange it for another laying tool present in the magazine;

and wherein several of the laying tools are each connected to the support of the magazine by an articulated compass, which is specific to the laying tool in question and which is arranged to accompany the laying tool when said laying tool is moved by the manipulator robot, each compass comprising for this purpose:

a barrel, by means of which the compass is attached to the support of the magazine and which allows said compass to be oriented in yaw by carrying out, with respect to the support of the magazine, a rotation about a vertical axis;

a first arm which is connected to the barrel by a first pivot connection of horizontal axis which allows the first arm to tilt in pitch with respect to the barrel; and a second arm which is articulated on the first arm by a second pivot connection of horizontal axis, distant from the first pivot connection, which allows the second arm to tilt in pitch with respect to the first arm, said second arm having, at a distance from the second pivot connection, a free end to which the laying tool in question is attached.

2. The installation according to claim 1, wherein the support of the magazine has a notched arrangement forming a concave delimitation with respect to the work area.

3. The installation according to claim 2, wherein the support of the magazine, in projection in a horizontal plane, defines a U-shape which opens onto the work area, said U-shape comprising a bottom branch and two lateral branches, and wherein compasses are installed on at least two of said branches.

4. The installation according to claim 3, wherein the U-shape is a trapezoidal U-shape that opens onto the work area via a large base of the trapezium.

5. The installation according to claim 3, wherein compasses are installed on each of the three branches.

6. The installation according to claim 1, wherein at least one laying tool is formed by a strip laying head which comprises an applicator roller arranged to press a strip against the drum, and a cutting blade for cutting the strip to a desired length at an end of laying, and wherein the compass which is associated with said strip laying head comprises a conveyor, which is arranged to convey the strip along the first and second arms of the compass to the strip laying head.

7. The installation according to claim 6, wherein the strip laying head comprises a heating element for heating the cutting blade, wherein an energy supply of said heating element passes through the compass, so as not to be interrupted when the manipulator robot puts the strip laying head back in the magazine and detaches itself from said strip laying head, whereas a drive energy supply which is intended to actuate the cutting blade to cut the strip, passes through the manipulator robot so as to be connected to the strip laying head when said manipulator robot grasps said strip laying head, then disconnected from said strip laying head when the manipulator robot separates again from said strip laying head.

8. The installation according to claim 7, wherein the energy supply is an electrical energy supply.

9. The installation according to claim 8, wherein the drive energy supply is a pneumatic or electrical energy supply.

10. The installation according to claim 6, wherein the conveyor is motorized.

11. The installation according to claim 1, wherein at least one of the laying tools is formed by a rubber pump which comprises an extruder which generates a band of rubber-based material to be laid on the drum.

12. The installation according to claim 11, wherein an energy supply to the extruder is provided by the manipulator robot by means of a mechanical coupling which engages the rubber pump when the manipulator robot grasps said rubber pump.

13. The installation according to claim 12, wherein the mechanical coupling is a dog.

14. The installation according to claim 1, wherein the constituents of the tire are rubber based components.

* * * * *